United States Patent Office
3,121,700
Patented Feb. 18, 1964

3,121,700
SOLUBLE NITROGEN-CONTAINING DERIVATIVES OF UNSATURATED ALDEHYDE POLYMERS, THEIR PREPARATION AND USE
Elliot Bergman, Berkeley, Calif., assignor to Shell Oil Company, New York, N.Y., a corporation of Delaware
No Drawing. Filed May 20, 1960, Ser. No. 30,438
19 Claims. (Cl. 260—29.6)

This invention relates to new polymeric materials and to their preparation. More particularly, the invention relates to new soluble nitrogen-containing polymeric derivatives, to their preparation from polymers of unsaturated aldehydes, and to the use of the new products, particularly for the treatment of fibrous materials.

Specifically, the invention provides new and particularly useful soluble nitrogen-containing derivatives of insoluble high molecular weight polymers of ethylenically unsaturated aldehydes, such as, for example, acrolein, which are preferably prepared by mixing and reacting the insoluble high molecular weight polymer of the unsaturated aldehyde with ammonia or an amine and preferably a basic primary and/or secondary amine, and still more preferably, one having a pKb value less than 10.

As a special embodiment, the invention provides new nitrogen-containing derivatives having a plurality of structural units as

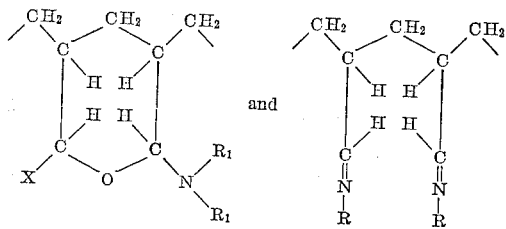

wherein R is hydrogen or a hydrocarbon radical, $R_1$ is organic radical (as hydrocarbon radical) and X is a hydroxyl or $-N(R)_2$ radical.

As a further special embodiment, the invention provides useful and valuable water-soluble derivatives of the above-described nitrogen-containing polymeric materials which are obtained by reacting the said nitrogen-containing materials with a water solubilizing agent, such as sodium bisulfite, sulfur dioxide and the like. The invention further provides a method for utilizing these water-soluble derivatives in the treatment of fibrous material, such as paper, textiles, leather and the like, to impart improved properties, such as improved strength, flexibility and the like.

Cellulosic paper when wet loses its strength and is easily torn. In order to overcome this defect, it has become common practice to treat the paper with a nitrogen-containing resin, such as urea or melamine-formaldehyde that can be subsequently cured to form an insoluble resin. While this method has imparted some improvement in wet strength, it leaves much to be desired in commercial applications. The wet strength provided by this method, for example, is not as high as required for many uses. In addition, the improvement in wet strength is only temporary and is lost after exposure to water. This has been found to be due in part to the fact that the cured nitrogen-containing resin is easily hydrolyzed, particularly in the presence of the acid curing agents remaining in the resin. Furthermore, the paper treated by the above-method does not have the desired dimensional stability, fold endurance and tear strength required for many applications. In some cases, attempts have been made to improve these properties by adding additional amounts of the nitrogen resin, but this only makes the paper lose its customary feel, appearance and flexibility.

It is an object of the invention to provide new polymeric derivatives and a method for their preparation. It is a further object to provide new soluble nitrogen-containing polymeric derivatives and a method for preparing the same from polymers of unsaturated aldehydes. It is a further object to provide new nitrogen-containing polymeric derivatives which are particularly useful and valuable in industry. It is a further object to provide new nitrogen-containing polymeric derivatives which may be used for the treatment of fibrous materials. It is a further object to provide new water-soluble derivatives of the nitrogen-containing polymeric materials which are promising wet and dry strength agents for treatment of paper and cellulosic materials. It is a further object to provide new method for treatment of cellulosic products which impart improved strength, fold endurance and good dimensional stability. Other objects and advantages of the invention will be apparent from the following detailed description thereof.

It has now been discovered that these and other objects may be accomplished by the new products of the invention comprising soluble nitrogen-containing derivatives of insoluble high molecular weight polymers of ethylenically unsaturated aldehydes, such as, for example, acrolein, which are preferably obtained by mixing and reacting the insoluble high molecular weight polymer of the unsaturated aldehyde with ammonia or an amine and preferably a secondary amine, and still more preferably one having a pKb less than 10. It has been found that when the normally insoluble high molecular weight polymers of the unsaturated aldehydes are contacted with these special materials there is a surprising dissolution of the polymer to form soluble nitrogen-containing derivatives which have been found to have many important properties. The new nitrogen-containing derivatives, for example, can be converted to water-soluble derivatives, such as by further reaction with sodium bisulfite and sulfur dioxide, which are promising materials for treatment of cellulosic materials as paper, textiles and the like. Paper treated with these derivatives have been found to have improved wet and dry strengths, improved fold endurance and improved dimensional stability, said properties being of a permanent nature and not lost on hydrolysis.

It was quite surprising to find that the insoluble polymers of the unsaturated aldehydes, such as the "disacryl" type polymers from acrolein, could be solubilized with the above-noted nitrogen-containing reactants as it has been previously found that such polymers are substantially insoluble in most reactants even after heating therewith for long periods of time. The unexpected reactivity of the above-noted special nitrogen-containing materials with the polymers to form soluble derivatives therewith is demonstrated in the working examples at the end of the specification.

The alpha,beta-ethylenically unsaturated aldehydes used in making the basic polymers comprise those aldehydes having an ethylenic group in an alpha,beta-position relative to the aldeheyde group, such as, for example, acrolein, alpha and beta-substituted acroleins such as alpha-ethylacrolein, alpha-isobutylacrolein, alpha-chloroacrolein, beta-phenylacrolein, alpha-decylacrolein, alpha-cyclohexylacrolein and the like. Preferred aldehydes to be employed in making the polymers include the alpha-beta-monoethylenically unsaturated aldehydes containing from 3 to 12 carbon atoms, and especially acrolein and the alpha and beta-substituted acroleins wherein the substituent on the alpha and/or beta positions is an alkyl, cycloalkyl or aryl group containing no more than 8 carbon atoms. 2-alkenals containing up to 8 carbon atoms come under special consideration.

The polymers of the above-described unsaturated aldehydes to be employed in preparing the new derivatives of the present invention are those obtained by addition polymerization through the double bond and those having a high molecular weight, i.e., those having a molecular weight above 50,000 and preferably between 100,000 and 2,000,000, said molecular weights being determined by the light scattering technique. The molecular weight range may also be indicated by intrinsic viscosity values as these are usually more easily determined. Preferred polymers are those having intrinsic viscosities (as determined on the solubilized form of the polymer) of at least 0.9 dl./g. and preferably between 0.9 dl./g. and 5.0. These values are determined by the conventional technique of polyelectrolyte viscosity measurements at 25° C.

The polymers include not only the homopolymers of the unsaturated aldehydes, but also the copolymers of the aldehydes with other ethylenically unsaturated monomers such as those possessing at least one =C=C= group, and preferably those containing a $CH_2=C=$ group, such as, for example, styrene, alpha-methylstyrene, butadiene, isoprene, methylpentadiene, ethylene, propylene, isobutylene, isooctene, vinyl acetate, vinyl propionate, vinylpyridine, vinylnaphthalene, vinylcyclohexene, acrylonitrile, methacrylonitrile, vinyl chloride, vinylidene chloride, acrylate esters as methyl methacrylate, ethyl acrylate, ethyl methacrylate, butyl acrylate and allylic compounds such as allyl acetate, allyl alcohol, allyl butyrate, allyl benzoate, allyl cyclohexanecarboxylate, allylamine and the like. These additional monomers are preferably employed in minor amounts, and preferably in amounts varying from about .5% to 40%, and preferably 1% to 35%, by weight of the mixture of monomers.

The preferred aldeheyde polymers are also those possessing a high theoretical aldehyde function, i.e., when the polymer is subjected to conventional tests for the presence of aldehyde groups (e.g., addition of hydroxylamine hydrochloride and titrated liberated $H_2O$ with Karl Fischer reagent) the results show a high percent, e.g., above 90%, and preferably 95% to 99%, of the theoretical aldehyde groups present as such or in the hydrated form. Many of the preferred polymers have the aldehyde groups present in the hydrated form as

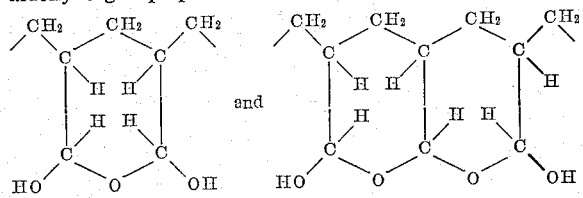

The above-described polymers may be prepared by a variety of different methods. They may be prepared, for example, by heating the unsaturated aldehyde with a free radical catalyst, such as peroxides as benzoyl peroxide, tertiary butyl hydroperoxide, tertiary butyl perbenzoate, tertiary butyl peracetate and the like, in bulk, emulsion or suspension under controlled conditions.

High molecular weight polymers which give outstanding results in the above preparation process are those having an I.V. of at least 0.9 dl./g. These polymers and a method for their preparation are disclosed and claimed in copending application Serial No. 859,156, filed December 14, 1959, and copending application Serial No. 859,154, filed December 14, 1959, and so much of the disclosure of these two applications relative to these polymers and their preparation is incorporated into this application.

The preparation of some of the acrolein polymers by the above-noted method is illustrated below.

*Polymer A*

100 parts of acrolein was added to 400 parts of water, to this mixture was added .271 part of potassium persulfate, .203 part of ferrous chloride tetrahydrate, 1 part of nonyl-phenyl-ethylene oxide adduct as anti-coalescent agent and .4 part of disodium salt of ethylene diamine tetraacetic acid. The resulting mixture was stirred for 24 hours at room temperature under an atmospheric of nitrogen. During this period, a white solid precipitated at the bottom. The mixture was filtered and the solid precipitate was washed with water and dried to yield 47 parts of polymer. The resulting product was a white powder polymer having an intrinsic viscosity (as determined on the sulfur dioxide solubilized form) of 1.8 dl./g.

*Polymer B*

100 parts of acrolein was added to 300 parts of water and to this mixture was added .272 part potassium persulfate, .203 part of ferrous chloride tetrahydrate and .4 part of disodium salt of ethylene diamine tetraacetic acid. The resulting mixture was stirred for 25 hours at 0° C. under an atmosphere of nitrogen. During that period a white solid precipitated to the bottom. The mixture was filtered and the solid precipitate was washed with water and dried to yield 27 parts polymer. The resulting product was a white powder polymer having an intrinsic viscosity (as determined on the sulfur dioxide solubilized form) of 2.3 dl./g.

*Polymer C*

1000 parts of acrolein was added to 2000 parts of water and to this mixture was added 2.73 parts of potassium persulfate, 2.02 parts ferrous chloride tetrahydrate, 10 parts of nonylphenol-ethylene oxide condensate and 4 parts of disodium salt of ethylene diamine tetraacetic acid. This mixture was stirred for 42 hours at room temperature (20° C.) under nitrogen. The resulting product was a white powder polymer having an intrinsic viscosity of 1.5.

*Polymer D*

100 parts of acrolein was added to 325 parts of water and to this mixture was added 2.70 parts of potassium persulfate, 2.00 parts of ferrous chloride tetrahydrate and 4 parts of disodium salt of ethylene diamine tetraacetic acid. This mixture was kept at room temperature for six hours with stirring and under an atmosphere of nitrogen. The resulting 46 parts of product was a white powder polymer having an intrinsic viscosity of 1.02 dl./g.

*Polymer E*

1500 parts of freshly distilled acrolein was combined with 1500 parts of acetic acid and 10 parts of azobis(isobutyronitrile) and the mixture kept at room temperature in the dark and in the presence of nitrogen for several hours. The mixture is then filtered and the product washed with water and acetone. Analysis of the solubilized form indicated that this polymer had an intrinsic viscosity of 1.47 dl./g.

The new nitrogen-containing polymeric derivatives of the present invention are obtained by mixing and reacting any one or more of the above-described insoluble high molecular weight polymers with ammonia or an amine, and preferably a basic primary and/or secondary amine, and still more preferably, one having a pKb value less than 10. Examples of the amines that can be used in the process of preparation include, among others, aliphatic, cycloaliphatic, heterocyclic and aromatic mono- and polyamines, such as, for example, methyl amine, ethylamine, butylamine, isopropylamine, octylamine, dodecylamine, eicosanylamine, tetradecenylamine, allylamine, cyclohexylamine, cyclohexenylamine, cyclopentylamine, cyclopentenylamine, ethylene diamine, diethylene triamine, triethylene tetraamine, hexamethylene diamine, N,N-diethylpropylene diamine, N,N-dibutylhexylene diamine, benzylamine, methoxybutylamine, butoxyethylamine, vinylpyridine, vinylpyrollidone, morpholine, monoamide of oleic acid and ethylene diamine, monoamide of benzoic acid and diethylene triamine, monoamide of chlorobenzoic acid and ethylene diamine, guinoline and the like. preferred amines to be employed include the primary and secondary monoamines having a pKb value of 1 to 7 and preferably containing from 2 to 20 carbon atoms.

The new nitrogen-containing polymeric derivatives are obtained by merely mixing the above-noted polymer with the liquid ammonia, primary or secondary amine or mixtures thereof. This may be accomplished by forming a suspension of the insoluble polymer in the liquid ammonia or amine and stirring the mixture until dissolution takes place. The amount of the ammonia or amine to be employed will vary over a wide range depending on the type of derivative desired. In general, it is preferred to convert from 1% to 85% or more of the aldehyde groups to the nitrogen-containing derivative. Accordingly, sufficient ammonia or amine should be employed to effect this type of conversion. In general, one mole of ammonia or amine should be employed for each aldehyde group to be reacted, and in the preferred case sufficient ammonia or amine should be employed so as to effect a reaction with from 1% to 85% of the aldehyde groups.

The temperature employed in the reaction will generally depend on the type of reactant employed with the polymer of the unsaturated aldehyde. When the nitrogen-containing reactant is a rather strong base, such as primary amine, the reaction is preferably conducted at a low temperature, e.g., 15-40° C. Results can also be obtained with the secondary amines at the low temperatures, but in some cases, it is preferred to use temperatures say from 30° C. to 100° C. When using a tertiary amine, such as quinoline, the reaction is preferably conducted at the higher temperatures, such as of the order of 80° C. to 200° C., and more preferably, at the boiling temperature of the amine.

The use of heat, e.g., 30 to 250° C., greatly increases the rate of reaction, and when one uses heat and the finely divided polymers obtained by the use of the emulsifying agents, the polymer may go into solution in a very few minutes.

At the conclusion of the reaction the nitrogen-containing polymers can be reacted by any suitable technique such as removal of the excess amines as by distillation, evaporation and the like or by precipitation of the polymer or the addition of water and the like.

When recovered, the nitrogen-containing polymers appear as substantially white solids. In general, they will contain at least one percent by weight of nitrogen and preferably 1% to 50% by weight of nitrogen. The molecular weights of the polymers will be in the general range of the starting insoluble aldehyde polymer, e.g., 50,000 to as high or higher than 2 million. The preferred nitrogen containing polymers are those having a molecular weight between 150,000 and 1½ million. These mol weights are determined by viscosity measurements as noted above.

With ammonia or the primary amines, the preferred products will have a plurality of structural units as

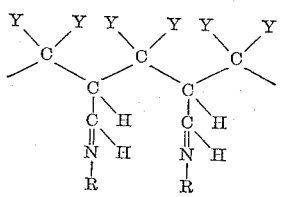

wherein Y is hydrogen or a lower alkyl radical and wherein R is as described above. Such ketimines are of particular value as latent curing agents, particularly for epoxy resins. When in contact with moisture, they form a ketone and an amine and the amines react therewith to form cross-linked products.

With secondary amines, the preferred products will have a plurality of structural units as

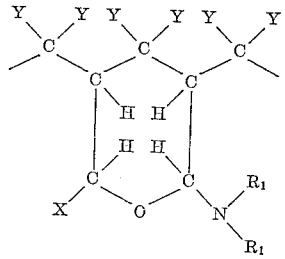

wherein Y is hydorgen or a lower alkyl, X and $R_1$ are as described above. These products are also useful as curing agents for epoxides and other resins.

As all the aldehyde or hydrate aldehyde groups will not be reacted with the nitrogen containing reactants, the new products will also contain active aldehyde or hydrated groups. The preferred nitrogen containing polymers of the invention wherein from 1% to 50% of the aldehyde groups have been converted to the nitrogen-containing groups may thus have a plurality of the above-described units (depending on whether a primary or secondary amine is used) and a plurality of the following structural units

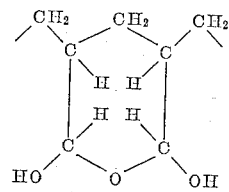

The nitrogen-containing polymers will be soluble in the liquid ammonia or amine in which it has been formed and with various other organic materials such as hydrocarbons, ketones and the like. In most cases, the nitrogen-containing polymers will be insoluble in water. However, the products may be converted to water soluble form with the addition of water soluble agents such as sulfur dioxide, sodium bisulfite and the like.

The water-solubilized polymers are obtained by suspending the nitrogen-containing polymer in aqueous solutions containing the solubilizing agent, such as the sulfur dioxide, sodium bisulfite and ammonium sulfite and bisulfite. Swelling agents, such as acetone, benzene and the like, as well as acid catalysts, such as p-toluenesulfonic acid, may be added to assist in the solution of the polymer. The amount of polymer added to the solubilizing agent will depend upon the agent selected, but in most cases, the polymer will be added in amounts varying from 1 to 50 parts per 100 parts of solubilizing agents.

The water-soluble polymer prepared as noted above with the sodium bisulfite and sulfur dioxide will have a chemical change in that the polymer will possess active sulfonic acid (or sodium salts thereof in case of the sodium bisulfite) groups in the polymer chain. The molecular weight of the new water soluble derivative will be about the same as that of the nitrogen-containing polymer.

The water solubilized polymer may be used for a great many applications. As water solutions, they may be used in the formation of films, threads, treatment of animal skins, and the like, and as coatings for various materials as wood, metal and the like.

As noted, the new nitrogen-containing polymers in the water soluble form have been found to be particularly useful as wet strength agents for paper. They are particularly suited for this application as they may be applied during the beater stage but they are as equally effective when applied to the already formed paper as an after treatment.

The addition at the beater stage may be at the beginning of the operation, intermittently or at the end of the operation. The amount added will vary depending upon the application intended. In most cases, the polymer is added so there is from 0.1% to 10% based on the weight of the paper pulp. After the solution has been added, the paper pulp may then be treated in the conventional manner for forming paper sheets and the resulting sheets dry under conventional standards, such as temperatures ranging from about 50° C. to 150° C.

If applied to the already formed paper, the addition may be made by spraying, rolling or dipping or by running the paper through the conventional padding apparatus. In this case, the aqueous solution of the nitrogen-containing polymers employed will preferably contain from 1% to 5% by weight of the polymer paper through a conventional-type padding apparatus. Amount of pick-up will vary, but in most cases, vary from about 25% to 100% based on the weight of paper.

After the aqueous system has been applied to the paper as indicated above, the treated product is then subsequently dried to effect the cure. The drying may be accomplished by merely rolling or squeezing off the excess solution and then setting out the paper in the air to dry, or by use of forced air. Temperatures used in the drying may vary from about room temperature, e.g., about 20° C. to 100° C. The period of drying will depend largely on the amount of pick-up and concentration of the polymer solution. In most instances, drying periods of from about 1 to 30 minutes should be sufficient.

Any type of paper may be treated according to the process of the invention. Examples of such paper include, for example, those prepared from wood, cotton, linen, hemp, jute, mulberry, straw, bamboo and cane fibers or mixtures thereof, by any of the known processes such as the sulfate process soda processed sulfite process. The paper may be colored or white and may be further treated for special applications.

The paper treated according to the process of the invention may be used for a variety of applications such as facial tissue, hand towels, maps, filing cards, construction paper, wrapping paper, containers and the like. Because of its resistance to hydrolysis and relative non-toxic nature, the paper is particularly suited for use in preparing wrapper or containers for food.

To illustrate the manner in which the invention may be carried out, the following examples are given. It is to be understood, however, that the examples are for the purpose of illustration and the invention is not to be regarded as limited to any of the specific materials or conditions recited therein.

*Example I*

This example illustrates the preparation of a nitrogen-containing polymeric derivative of polyacrolein using isopropylamine and the use of the derivative for the treatment of paper.

10 parts of an insoluble polymer of acrolein having an intrinsic viscosity of 1.5 dl./g. prepared as in Polymer C above was added to 100 parts of isopropylamine and the mixture stirred at room temperature. In about 4 hours, the polymer had all dissolved. The resulting mixture was vacuum stripped to yield a substantially white solid. Analysis of the product indicated it was an amine derivative of polyacrolein containing 12.2% nitrogen. Carbon, 71.7%; hydrogen, 10.6%; and oxygen, 5.5%. The above polymer is useful as a curing agent for epoxy resins.

10 parts of the above-described nitrogen-containing polymeric derivative was suspended in water to form a 10% slurry. Sulfur dioxide was bubbled into the solution at room temperature for about 1 hour. The container was then sealed and stirred for several more hours. By that time, the polymer had gone into solution. The resulting product, after evaporation of the water, was a water-soluble crystalline solid having an intrinsic viscosity of about the same as the original nitrogen-containing derivative.

A 1%, 2% and 3% water solution of the above-described water-soluble solid was prepared by adding the necessary amount of salt to the water. Sheets of bleached sulfite paper were then passed into and through the water solution so as to effect a 100% wet pick-up. The sheets were pressed out on dry paper and then allowed to dry at room temperature.

The resulting sheets had the appearance, feel and flexibility of the untreated paper, but demonstrated surprising improvement in fold endurance, dimensional stability, resistance to hydrolysis and improved strength.

*Example II*

10 parts of a polyacrolein having an intrinsic viscosity of 0.9 dl./g. is added to an aqueous solution of methylamine to form a 10% slurry. After two days at room temperature part of the polymer is soluble in dilute HCl indicating the introduction of amine nitrogen into the polymer. The polymer is useful as an epoxy curing agent.

A sulfur dioxide derivative of the above polymer is used to treat paper as shown in the preceding example. The resulting paper after drying demonstrates improved strength, fold endurance and improved dimensional stability.

*Example III*

This example illustrates the preparation of a nitrogen-containing polymeric derivative of polyacrolein using butylamine, and the use of the derivative for treatment of paper.

10 parts of an insoluble polymer of acrolein having an intrinsic viscosity of 1.5 dl./g. prepared as in Polymer A was added to 100 parts of n-butylamine and the mixture stirred and heated to 50–80° C. for ½ hour. The resulting mixture was poured into water to yield a substantially white solid polymer.

A sulfur dioxide derivative of the above polymer was used to treat bleached sulfite paper as shown in Example I. The resulting paper after drying demonstrated improved wet and dry strength, fold endurance and improved dimensional stability.

*Example IV*

10 parts of an insoluble polymer of acrolein having an intrinsic viscosity of about 1.5 dl./g. prepared as shown in Polymer A above was added to 100 parts of ethoxypropylamine and the mixture stirred at room temperature for 3 days. By that time the polymer had gone into solution. The mixture was poured into water to yield 16 g. of a white solid polymer containing 8.85% nitrogen, 67.2% carbon and 10.0% hydrogen. It melted between 130–170° C.

A sulfur dioxide derivative of the above polymer was used to treat bleached sulfite paper as shown in Example I. The resulting paper after drying demonstrated improved wet and dry strength, fold endurance and improved dimensional stability.

*Example V*

10 parts of an insoluble polyacrolein having an intrinsic viscosity of 2.0 dl./g. prepared as shown in Polymer C above was added to 100 parts of allylamine and the mixture heated at 50–80° C. for about 1 hour. At that time, the polymer had gone into solution. Pouring the resulting mixture into water yielded a white solid polymer.

A sulfur dioxide derivative of the above polymer is used to treat bleached sulfite paper as shown in Example I. The resulting paper after drying demonstrated improved wet and dry strength, fold endurance and improved dimensional stability.

Example VI 10 parts of an insoluble polyacrolein having an intrinsic viscosity of 1.5 dl./g. prepared as shown in Polymer C above was added to 100 parts of N,N-diethylpropylene diamine and the mixture heated to 50–80° C. The polymer slowly dissolved after several hours stirring and heating at this temperature. Vacuum stripping of the resulting mixture yielded a white solid polymer.

A sulphur dioxide derivative of the above polymer was used to treat bleached sulfite paper as shown in Example I. The resulting paper after drying demonstrated improved wet and dry strength, fold endurance and improved dimensional stability.

Example VII 10 parts of an insoluble polyacrolein having an intrinsic viscosity of 1.5 dl./g. prepared as shown in Polymer A above was added to 100 parts of benzylamine and the mixture heated at 50–80° C. The polymer dissolved after a short period of stirring. Precipitation of the resulting mixture with water yielded a white solid polymer which is soluble in dioxane.

Example VIII 10 parts of an insoluble polyacrolein having an intrinsic viscosity of 1.5 dl./g. prepared as shown in Polymer A above was added to 100 parts of aniline and the mixture heated on a steam bath. After several hours, part of the polymer dissolved. After vacuum stripping, a white solid nitrogen-containing polymer was obtained.

Example IX 15 parts of a polyacrolein having an intrinsic viscosity of 1.6 dl./g. was added to 200 parts of liquid ammonia and the mixture refluxed for 30 hours. The ammonia was then allowed to evaporate. The resulting product was a tan solid having the following analysis: Nitrogen, 17.7; hydrogen, 8.6; carbon, 56.1; and oxygen, 17.6. Similarly using polyacroleins having I.V.'s of 0.9, 1.0 and 1.4, materials having 14–19% nitrogen were obtained.

A sulfur dioxide derivative of the above polymer material prepared as in Example I was used to treat bleached sulfite paper. The resulting paper after drying demonstrated improved wet and dry strength, fold endurance and improved dimensional stability.

Example X 7 parts of a polyacrolein having an intrinsic viscosity of 1.5 dl./g. is added to 350 parts of concentrated ammonium hydroxide solution and the mixture stirred for 6 days at room temperature. The resulting mixture is evaporated to dryness leaving a white solid polymer having the following analysis: Nitrogen, 19.0; hydrogen, 8.8; carbon, 58.1; and oxygen, 14.1.

A sulfur dioxide derivative of the above polymer is prepared as in Example I and is used to treat bleached sulfite paper. The resulting paper after drying demonstrated improved wet and dry strength, fold endurance and improved dimensional stability.

Example XI

Example IX was repeated using an alcoholic solution of ammonia. Related products are obtained.

Example XII 10 parts of an insoluble polymer of acrolein having an intrinsic viscosity of 1.5 dl./g. prepared as shown in Polymer A above was added to 100 parts of pyrrolidone and was stirred at room temperature for 2 hours. By that time, almost all of the polymer had dissolved. Filtration and precipitation with water gave a white solid having 8.72% nitrogen, 67.0% carbon and 9.6% hydrogen.

A sulfur dioxide derivative of the above polymer was prepared as in Example I and used to treat bleached sulfite paper as in Example I. Related results are obtained.

Example XIII 10 parts of an insoluble polymer of acrolein having an intrinsic viscosity of 2.1 dl./g. prepared as shown in Polymer A above was added to 100 parts of morpholine and the mixture heated on the steam bath. The polymer dissolved in about ½ hour. Vacuum stripping of the mixture yielded a white nitrogen-containing polymer.

A sulfur dioxide derivative of the above polymer was prepared as in Example I and used to treat bleached sulfite paper as in Example I. Related results are obtained.

Example XIV

Example XIII was repeated with the exception that the morpholine was replaced by piperidine. Related products and properties are obtained.

Example XV 10 parts of an insoluble polymer of acrolein having an intrinsic viscosity of 1.5 dl./g. prepared as shown in Polymer A above was added to 100 parts of benzylmethylamine and the mixture heated on the steam bath. After dissolution, the product was stripped to yield a white solid nitrogen-containing polymer.

Example XVI 0.5 part of polymethacrolein having an intrinsic viscosity of about 1.0 dl./g. was added to 10 parts of isopropylamine. In a few minutes the polymer started to dissolve and in about 16 hours had dissolved completely. A colorless solid nitrogen-containing polymer was precipitated with water.

Example XVII

The preceding example was repeated using pyrrolidone. The polymer dissolved in a short while at room temperature to form a colorless solid nitrogen-containing polymer derivative.

Example XVIII 10 parts of a $C_{12}$ long chain mono primary amine was combined with 1 part of polyacrolein having an intrinsic viscosity of 1.5 and prepared as in Polymer C and the mixture heated to 80° C. The resulting nitrogen-containing polymer was soluble in xylene.

Related results are obtained by replacing the $C_{12}$ amine with a $C_{14}$ and a $C_{16}$ monoamine.

Example XIX 2 parts of polyacrolein prepared as in Polymer C and having an intrinsic viscosity of 1.8 dl./g. was added to 100 parts of quinoline and the mixture heated to 150° C. The polymer dissolved in a few minutes. Stripping in a vacuo gave a solid white nitrogen-containing polymer.

Example XX

Example XV was repeated with the exception that dioxane was included with the piperidine. In this case, the polymer dissolved more rapidly than in the absence of dioxane. The resulting polymer had related properties.

I claim as my invention:

1. A nitrogen-containing high molecular weight polymeric product derived from an acetone-insoluble addition polymer of acrolein, said nitrogen-containing polymer having a plurality of structural units of the group consisting of

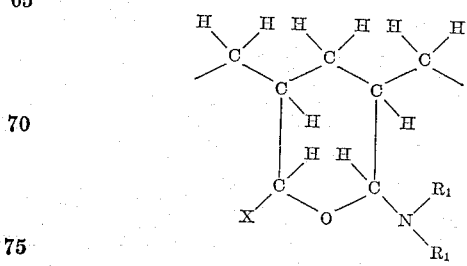

and

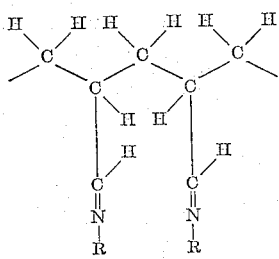

wherein R is a member of the group consisting of hydrogen and hydrocarbon radicals, $R_1$ is a hydrocarbon radical and X is a member of the group consisting of hydroxyl radical and a $-N(R)_2$ radical with substantially all of the remaining units being selected from the group consisting of

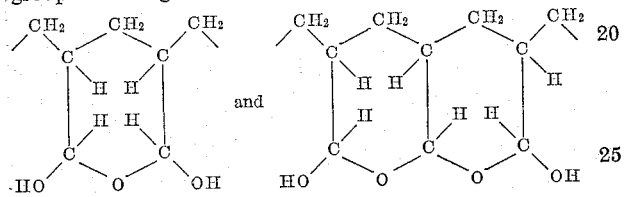

and said nitrogen-containing polymer having an intrinsic viscosity above 0.9 dl./g.

2. A nitrogen-containing derivative of an actone insoluble high molecular weight addition polymer of an alpha, beta-ethylenically unsaturated aldehyde, said derivative having a plurality of structural units of the group consisting of

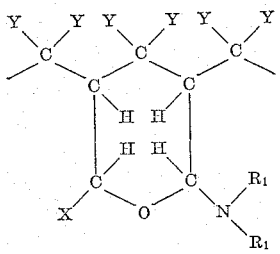

and

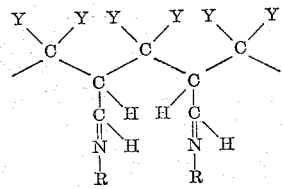

wherein Y is a member of the group consisting of hydrogen and lower alkyl, R is a member of the group consisting of hydrogen and hydrocarbon radicals, $R_1$ is a hydrocarbon radical and X is a member of the group consisting of hydroxyl radical and an $-N(R)_2$ radical.

3. A water solution of a water-soluble reaction product of (1) a nitrogen-containing polymer as defined in claim 1, and (2) a member of the group consisting of sulfur dioxide, sodium bisulfite, ammonium bisulfite and ammonium sulfite.

4. A nitrogen-containing high molecular weight having a plurality of structural units having the formula

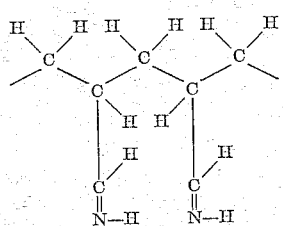

with substantially all of the remaining units being selected from the group consisting of

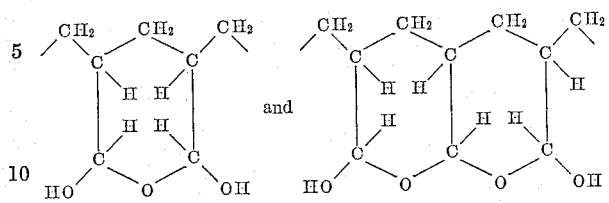

said polymer being soluble in liquid ammonia and having an intrinsic viscosity above 0.9 dl./g.

5. A nitrogen-containing high molecular weight polymer having a plurality of structural units having the formula

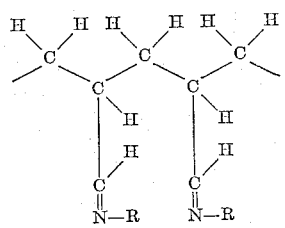

wherein R is a hydrocarbon radical with substantially all of the remaining units being selected from the group consisting of

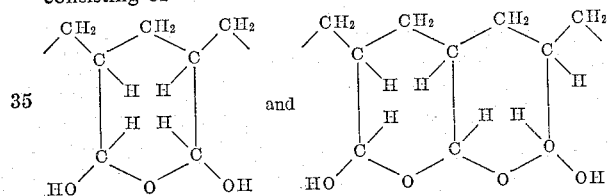

said nitrogen-containing polymer being soluble in a primary amine $H_2NR$ and having an intrinsic viscosity above 0.9 dl./g.

6. A polymer as in claim 4 which has an intrinsic viscosity between 0.9 dl./g. and 4.0 dl./g.

7. A nitrogen-containing polymeric derivative having a plurality of structural units of

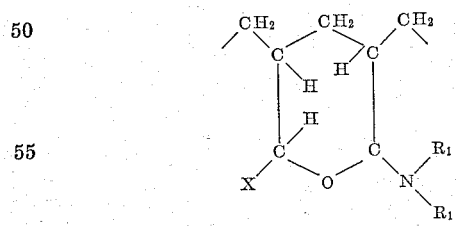

wherein $R_1$ is a hydrocarbon radical containing 1 to 25 carbon atoms and X is a member of the group consisting of hydroxyl radical and $-N(R)_2$ radicals wherein R is a member of the group consisting of hydrogen and hydrocarbon radicals, and a plurality of structural units of

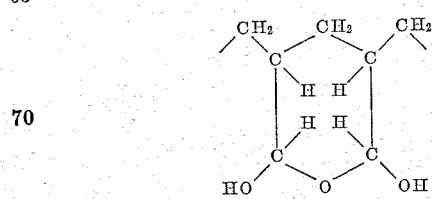

8. A nitrogen-containing high molecular weight polymer having a plurality of structural units having the formula

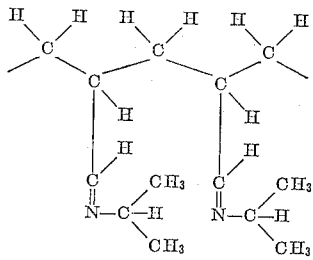

with substantially all of the remaining units being selected from the group consisting of

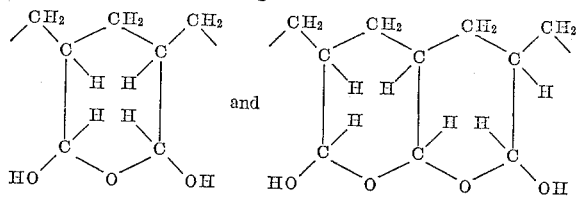

said polymer being soluble in isopropyl amine and having an intrinsic viscosity of at least 0.9 dl./g.

9. A process for preparing polymeric nitrogen-containing materials which consists essentially of mixing and reacting an acetone insoluble high molecular weight polymer of an alpha, beta-ethylenically unsaturated aldehyde with a member of the group consisting of ammonia, hydrocarbon primary amines and hydrocarbon secondary amines.

10. A process as in claim 9 wherein the high molecular weight polymer is a polymer of acrolein.

11. A process as in claim 9 wherein the high molecular weight polymer is a polyacrolein having an intrinsic viscosity between 0.9 dl./g. and 4.0 dl./g.

12. A process as in claim 9 wherein the primary amine is octyl amine.

13. A process as in claim 9 wherein the amine reactant is piperidine.

14. A process as in claim 9 wherein the reaction is conducted at a temperature between 15° C. and 100° C.

15. A process as in claim 9 wherein the unsaturated aldehyde polymer is a polymer of methacrolein.

16. A water-soluble derivative of the nitrogen-containing polymeric material defined in claim 2 obtained by reacting the said polymeric material with a member of the group consisting of sulfur dioxide, sodium bisulfite, ammonium bisulfite and ammonium sulfite.

17. A water-soluble derivative of the nitrogen-containing polymeric material defined in claim 2 obtained by reacting the said polymeric material with sulfur dioxide.

18. A water-soluble derivative of the nitrogen-containing polymeric material defined in claim 2 obtained by reacting the said polymeric material with sodium bisulfite.

19. A water solution of a water-soluble reaction product of (1) a nitrogen-containing polymer as defined in claim 2 and (2) a member of the group consisting of sulfur dioxide, sodium bisulfite, ammonium bisulfite and ammonium sulfite.

References Cited in the file of this patent

UNITED STATES PATENTS 2,657,192   Miller et al. _____ Oct. 27, 1953

FOREIGN PATENTS 797,459   Great Britain _____ July 2, 1958
803,053   Great Britain _____ Oct. 15, 1958

OTHER REFERENCES

Conant et al.: "The Chemistry of Organic Compounds," The Macmillan Company, 1948, page 135.

Conant and Blatt: "The Chemistry of Organic Compounds," 4th Edition, 1952, Macmillan Company, New York, pages 112 and 113.